(12) United States Patent
Wei et al.

(10) Patent No.: US 10,968,890 B2
(45) Date of Patent: Apr. 6, 2021

(54) CONTROLLING WIND TURBINE POWER PRODUCTION WITHIN POWER RAMP RATE LIMIT FOR WIND POWER PLANT

(71) Applicant: VESTAS WIND SYSTEMS A/S, Aarhus N (DK)

(72) Inventors: Mu Wei, Solbjerg (DK); Martin Ansbjerg Kjær, Harlev J (DK); Kouroush Nayebi, Ikast (DK); Jesper Sandberg Thomsen, Hadsten (DK); Eik Herbsleb, Odder (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 179 days.

(21) Appl. No.: 15/780,733

(22) PCT Filed: Nov. 25, 2016

(86) PCT No.: PCT/DK2016/050398
§ 371 (c)(1),
(2) Date: Jun. 1, 2018

(87) PCT Pub. No.: WO2017/097307
PCT Pub. Date: Jun. 15, 2017

(65) Prior Publication Data
US 2018/0355848 A1 Dec. 13, 2018

(30) Foreign Application Priority Data
Dec. 10, 2015 (DK) .................................. 2015 70814

(51) Int. Cl.
| F03D 7/02 | (2006.01) |
| F03D 7/04 | (2006.01) |
| H02J 3/38 | (2006.01) |
| G05B 19/042 | (2006.01) |

(52) U.S. Cl.
CPC ............ *F03D 7/0284* (2013.01); *F03D 7/026* (2013.01); *F03D 7/0272* (2013.01); *F03D 7/048* (2013.01);
(Continued)

(58) Field of Classification Search
None
See application file for complete search history.

(56) References Cited

U.S. PATENT DOCUMENTS

2007/0173982 A1    7/2007  Cardinal et al.
2008/0284172 A1*  11/2008  Nielsen .................. F03D 7/026
                                                          290/44
(Continued)

FOREIGN PATENT DOCUMENTS

CN     102817775 A    12/2012
EP      1672779 A2     6/2006
(Continued)

OTHER PUBLICATIONS

Chinese Office Action for Application No. 201680081342.8 dated Apr. 25, 2019.
(Continued)

*Primary Examiner* — Bernard G Lindsay
(74) *Attorney, Agent, or Firm* — Patterson + Sheridan, LLP

(57) ABSTRACT

A method and associated control arrangement are disclosed for controlling a power output of a wind power plant (WPP) according to a predetermined power ramp rate limit, the WPP comprising a plurality of wind turbine generators (WTGs). The method comprises receiving a first signal indicating that a first WTG is in a ready state to begin producing power. The method further comprises, upon determining that, responsive to the received first signal, beginning power production of the first WTG at a predeter- (Continued)

mined default power ramp rate would cause the power output of the WPP to exceed the power ramp rate limit, controlling power production of the first WTG using at least one of: a first delay, a power ramp rate reference less than the default power ramp rate, and a power reference less than a nominal power output of the first WTG.

15 Claims, 6 Drawing Sheets

(52) U.S. Cl.
CPC ............ *G05B 19/042* (2013.01); *H02J 3/386* (2013.01); *F05B 2220/706* (2013.01); *F05B 2270/1033* (2013.01); *F05B 2270/309* (2013.01); *F05B 2270/327* (2013.01); *F05B 2270/335* (2013.01); *G05B 2219/2619* (2013.01); *Y02E 10/72* (2013.01); *Y02E 10/76* (2013.01)

(56) References Cited

U.S. PATENT DOCUMENTS

| | | | |
|---|---|---|---|
| 2009/0191060 A1* | 7/2009 | Bagepalli | F16H 57/0413 416/174 |
| 2010/0191384 A1 | 7/2010 | Jurkat | |
| 2011/0140423 A1 | 6/2011 | Menke | |
| 2015/0252784 A1* | 9/2015 | Seymour | F03D 7/026 290/44 |
| 2017/0016336 A1* | 1/2017 | de Lazzer | F01D 5/3038 |
| 2017/0074243 A1* | 3/2017 | Baba | F03D 9/255 |

FOREIGN PATENT DOCUMENTS

| | | |
|---|---|---|
| EP | 1790851 A2 | 5/2007 |
| WO | 2017097307 A1 | 6/2017 |

OTHER PUBLICATIONS

PCT Notification of Transmittal of the International Search Report and the Written Opinion of the International Searching Authority, or the Declaration for Application No. PCT/DK2016/050398 dated Feb. 28, 2017.

Mark Cardinal et al.: 11 Grid Friendly wind Power Plants: Windeontrol(TM)—Field Test 7-10' 12' results 11 Windpower, Jun. 1, 2006 (Jun. 1, 2006), pp. 1-8, XP055266021, pp. 4, 6; figure 5.

Danish Patent and Trademark Office Technical Examination for Application No. PA 2015 70814 dated Jul. 30, 2016.

* cited by examiner

CONTROLLING WIND TURBINE POWER PRODUCTION WITHIN POWER RAMP RATE LIMIT FOR WIND POWER PLANT

BACKGROUND

Field of the Invention

Embodiments presented in this disclosure generally relate to techniques for controlling wind turbine power production to meet a power ramp rate limit for an associated wind power plant.

Description of the Related Art

Modern power generation and distribution networks increasingly rely on renewable energy sources, such as wind turbines. In some cases, the wind turbines may be substituted for conventional, fossil fuel-based generators. Beyond merely generating and delivering electrical power to the electrical grid, the wind turbines are responsible for contributing to grid stability through frequency regulation. However, operational conditions of the wind turbine generators as well as natural variations in wind conditions can affect the ability of wind turbines to predictably deliver power. Additionally, wind conditions may at times be unsuitable for generating power.

To promote reliability and stability of the electrical grid, grid code requirements may specify one or more power ramp rate limits that limit time-based variations in electrical power delivered by a wind power plant (WPP) to the electrical grid. In some cases, individual wind turbines (also wind turbine generators, or WTGs) of the WPP are unable to instantaneously generate power when requested, instead having an associated delay before being ready to produce power. Because these delays can be an unknown length of time and/or can differ between WTGs, the unpredictability of WTG power production can cause the collective WPP power output to exceed the imposed power ramp rate limit. Further, control strategies designed to ensure compliance with the power ramp rate limit, if too conservative, may unnecessarily limit power production, resulting in possible revenue lost for the WPP owner or operator.

SUMMARY

One embodiment of the present disclosure is a method of controlling a power output of a wind power plant (WPP) according to a predetermined power ramp rate limit, the WPP comprising a plurality of wind turbine generators (WTGs). The method comprises receiving, from a first WTG of the plurality of WTGs, a first signal indicating that the first WTG is in a ready state to begin producing power. The method further comprises upon determining that, response to the received first signal, beginning power production of the first WTG at a predetermined default power ramp rate would cause the power output of the WPP to exceed the power ramp rate limit, controlling power production of the first WTG using at least one of: (1) a first delay before instructing the first WTG to begin producing power, (2) a power ramp rate reference less than the default power ramp rate of the first WTG, and (3) a power reference less than a nominal power output of the first WTG.

The method advantageously allows the power output of the WPP to be closely controlled to prevent violating imposed grid code requirements, such as the power ramp rate limit, without needlessly curbing power delivery and thereby losing potential revenue. Further, using the handshake communications between the WTG controller and the WPP controller helps to overcome the unknown delays associated with each WTG separately preparing to reach the ready state for producing power.

Another embodiment of the present disclosure is a control arrangement for operating a wind power plant (WPP) according to a predetermined power ramp rate limit, the WPP comprising a plurality of wind turbine generators (WTGs). The control arrangement comprises a plurality of WTG controllers corresponding to the plurality of WTGs, and a power plant controller (PPC) communicatively coupled with the plurality of WTG controllers. The PPC is configured to receive, from a first WTG controller of the plurality of WTG controllers corresponding to a first WTG of the plurality of WTGs, a first signal indicating that the first WTG is in a ready state to begin producing power. The PPC is further configured to, upon determining that, responsive to the received first signal, that beginning power production of the first WTG at a predetermined default power ramp rate would cause the power output of the WPP to exceed the power ramp rate limit, control power production of the first WTG using at least one of: (1) a first delay before instructing the first WTG controller to begin producing power, (2) a power ramp rate reference less than the default power ramp rate of the first WTG, and (3) a power reference less than a nominal power output of the first WTG.

The control arrangement advantageously allows the power output of the WPP to be closely controlled to prevent violating imposed grid code requirements, such as the power ramp rate limit, without needlessly curbing power delivery and thereby losing potential revenue. Further, using the handshake communications between the WTG controller and the WPP controller helps to overcome the unknown delays associated with each WTG separately preparing to reach the ready state for producing power.

Another exemplary embodiment further includes receiving, from the first WTG and before receiving the first signal, a second signal indicating that the rotor speed of the first WTG has reached a predetermined intermediate rotor speed value less than the nominal rotor speed value; determining, in response to the received second signal, whether continuing to increase the rotor speed from the intermediate rotor speed value to the nominal rotor speed value to subsequently begin power production at the predetermined default power ramp rate would cause the power output of the WPP to exceed the power ramp rate limit; and transmitting, after a second delay, an instruction to the first WTG to increase the rotor speed from the intermediate rotor speed value to the nominal rotor speed value.

This embodiment advantageously improves the responsiveness of the first WTG to reach the ready state and subsequently produce power when requested by the WPP controller, when compared with starting the first WTG from a standstill state. By transitioning the first WTG through an intermediate non-power producing operational state in which the rotor speed is significantly lower than the nominal rotor speed, the rotor speed is much less likely to cause excessive wear on the drivetrain and/or other components of the first WTG. Further, the first WTG may remain in the intermediate operational state for a much longer period of time due to the reduced concerns of excessive wear, when compared with the ready state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments are generally directed to techniques of controlling a power output of a wind power plant (WPP) according to a predetermined power ramp rate limit. More specifically, power production of a first wind turbine generators (WTG) of the WPP is controlled using at least one of: (1) a first delay before instructing the first WTG to begin producing power, (2) a power ramp rate reference less than the default power ramp rate of the first WTG, and (3) a power reference less than a nominal power output of the first WTG. Advantageously, the power output of the WPP can be closely controlled to prevent exceeding the power ramp rate limit, without needlessly curbing power delivery and thereby losing potential revenue. Further, the communications between the WTG controller and the WPP controller helps to overcome the unknown delays associated with each WTG separately preparing to reach the ready state for producing power.

Additionally, the responsiveness of the first WTG to reach the ready state and subsequently produce power when requested by the WPP controller can be improved, when compared with starting the first WTG from a standstill state. By transitioning the first WTG through an intermediate non-power producing operational state in which the rotor speed is significantly lower than the nominal rotor speed, the rotor speed is much less likely to cause excessive wear on the drivetrain and/or other components of the first WTG. Further, the first WTG may remain in the intermediate operational state for a much longer period of time due to the reduced concerns of excessive wear, when compared with the ready state.

Figure 1:
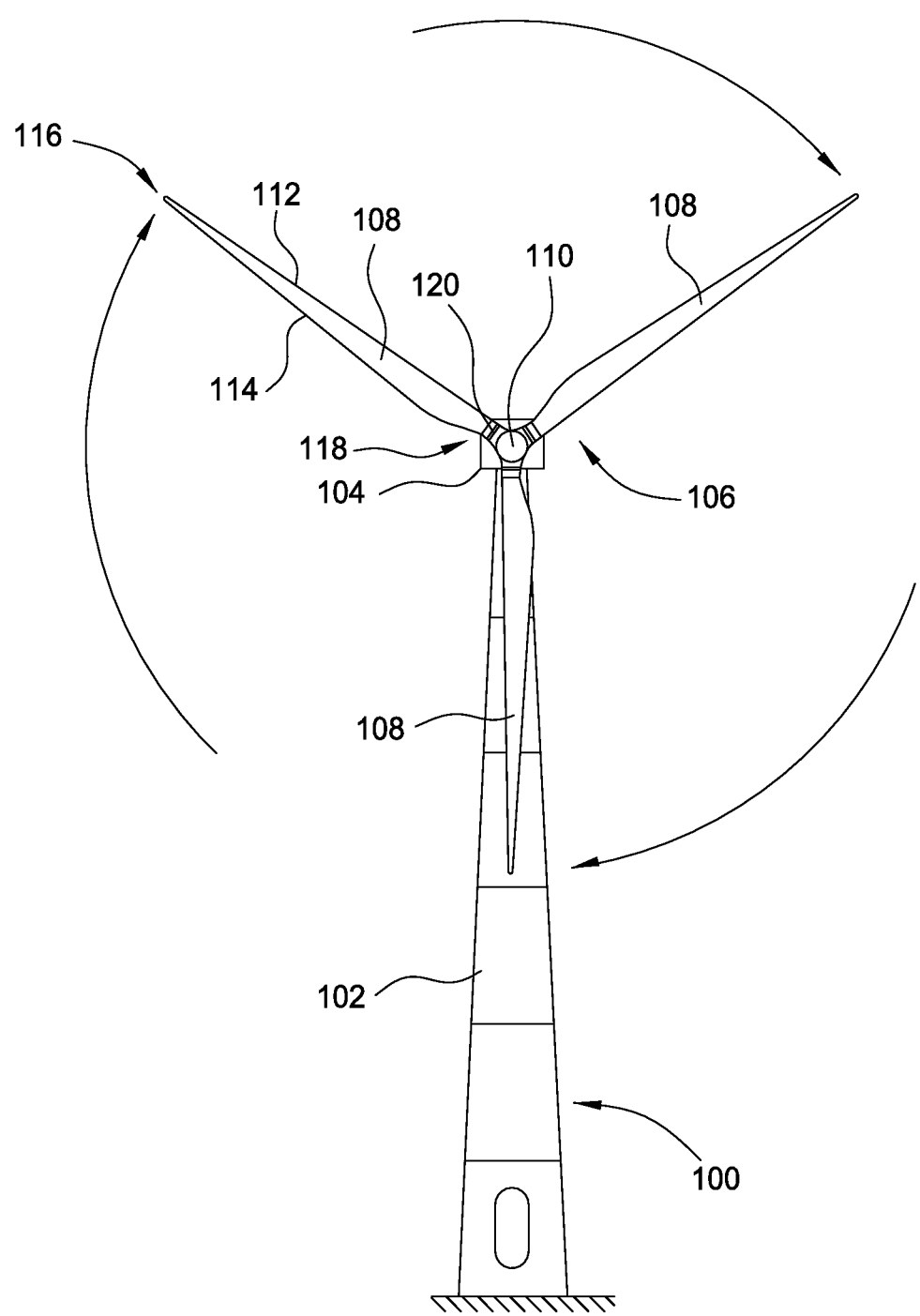
FIG. 1 illustrates a diagrammatic view of a horizontal-axis wind turbine, according to one embodiment.

FIG. 1 illustrates a diagrammatic view of a horizontal-axis wind turbine (WTG) 100. The wind turbine 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner. For some embodiments, the blades 108 may be connected to the hub 110 using pitch bearings 120 such that each blade 108 may be rotated around its longitudinal axis to adjust the blade's pitch.

Figure 2:
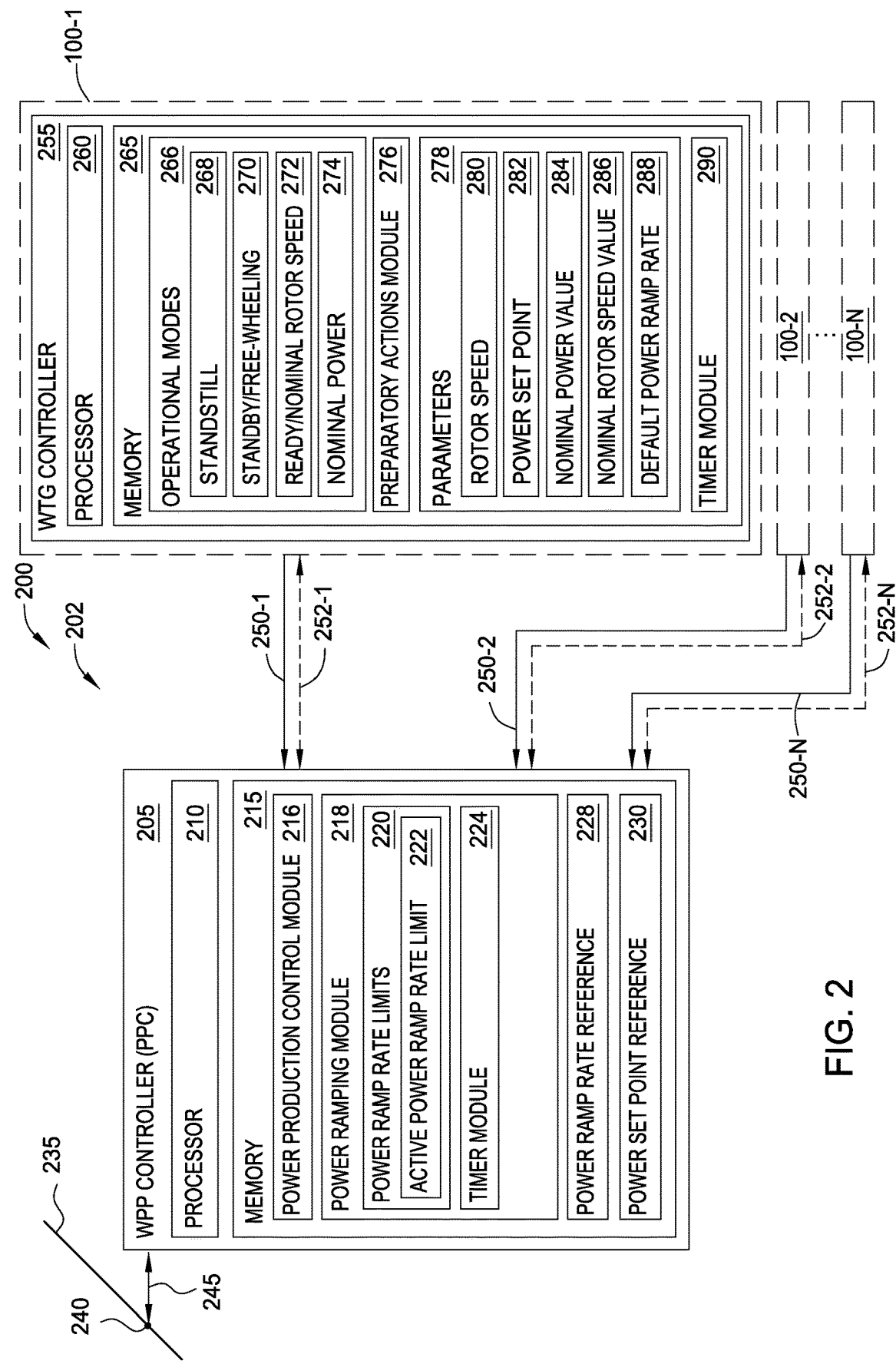
FIG. 2 illustrates a wind power plant operatively connected with an electrical grid, according to one embodiment.

FIG. 2 illustrates a wind power plant operatively connected with an electrical grid, according to one embodiment. In general, a wind power plant may also be referred to as a wind farm or wind park. The wind power plant (WPP) 200 includes a plurality of wind turbines (or WTGs) 100 (i.e., wind turbines 100-1, 100-2, ..., 100-N) that are operatively connected with an electrical grid 235 at a point of common coupling (PCC) 240. The electrical grid 235 represents any suitable electrical transmission and/or distribution grids, which may be operated at one or more voltages. The electrical grid 235 generally includes a number of transmission lines, transformers, substations, power plants, etc.

Each wind turbine (WTG) 100-1, 100-2, ..., 100-N includes an electrical generator (not shown) configured to convert the mechanical energy of the wind turbine rotor 106 into one or more phases of electrical power as respective power outputs 250-1, 250-2, ..., 250-N that are ultimately delivered to the electrical grid 235 and to any loads connected therewith. The electrical generators may be of any suitable type, as would be known to a person skilled in the art.

The operation of the wind power plant 200 is controlled using a control arrangement 202, which includes a WPP controller 205 (also PPC) communicatively coupled with one or more WTG controllers 255 using connections 252-1, 252-2, ..., 252-N, which represent any suitable communication means, whether wire-based or wireless. In some embodiments, each WTG 100 is controlled by a separate WTG controller 255. In various embodiments, the WTGs 100-1, 100-2, ..., 100-N produce electrical power based on control signals provided by WPP controller 205 (over connections 252-1, 252-2, ..., 252-N) and/or WTG controllers 255. The WTG controllers 255 may provide feedback signals and/or other information to the WPP controller 205 using the connections 252-1, 252-2, ..., 252-N.

The power output 245 is controlled by the WPP controller 205 and represents a collective power output delivered to the electrical grid 235 by the WPP 200. In one embodiment, the power output 245 is an aggregation of the various power outputs 250-1, 250-2, ..., 250-N. In another embodiment the power output 245 can include, in addition to the power outputs 250-1, 250-2, ..., 250-N, effects from signal conditioning and/or the operation of other power sources or loads controlled by the WPP controller 205, such as energy storage devices.

The WPP controller 205 includes one or more processors 210 and memory 215. Each of the WTG controllers 255 includes one or more processors 260 and memory 265. The processors 210, 260 may have any suitable form, such as a general purpose microprocessor, a controller, an application-specific integrated circuit (ASIC), and so forth. Memories 215, 265 may include a variety of computer-readable media selected for their size, relative performance, or other capabilities: volatile and/or non-volatile media, removable and/or non-removable media, etc.

Memory 215, 265 may include one or more modules for performing various functions described herein. The modules generally include program code that is executable by one or more of the processors 210, 260. As shown, the wind power plant controller 235 includes a power production control module 216 (or "power production module," "power module"), a power ramping module 218, and a timer module 224.

The power module 216 is configured to generate power set points or other suitable power demand signals for controlling the power produced by each of the WTGs 100-1, 100-2, ..., 100-N of the WPP 200. In some cases, the power module 216 generates the set points based on a received or generated WPP-level power demand signal, such as a WPP power output set point, according to any suitable techniques. The set points may be transmitted to individual WTG controllers 255 using connections 252-1, 252-2, ..., 252-N.

The power ramping module 218 is configured to adjust operation of the power production control module 216 to meet power ramping requirements included within grid code requirements. More specifically, the power ramping requirements for power ramping module 218 include one or more predetermined power ramp rate limits 220. In some embodiments, a plurality of power ramp rate limits 220 are included that each correspond to a different control strategy, such as a gradient ramp rate control, frequency ramp rate control, and so forth. The power ramp rate limit 220 that is currently being implemented or enforced is represented as active power ramp rate limit 222. The power ramp rate limits 220 may be expressed in any suitable form, and will vary based on the grid code requirements, the size of the WPP 200, etc. Some non-limiting examples of power ramp rate limit 220 are 300 kilowatts (kW) per second (300 kW/s) and 0.1 per-unit (pu)/s, although many other values and units are possible.

In some embodiments, and in order to comply with the active power ramp rate limit 222, the power ramping module 218 causes the power module 216 to adjust the generated power set points before the power set points are transmitted to the WTG controllers 255. In one embodiment, the power ramping module 218 calculates one or more power set point references 230 that can be transmitted directly to one or more WTG controllers 255 to control power set points for corresponding WTGs 100. Additionally or alternatively, the power ramping module 218 calculates one or more power ramp rate references 228 that can be transmitted directly to one or more WTG controllers 255, causing the WTG controllers 255 to limit or otherwise control a power ramping rate for corresponding WTGs 100 as the power output 250 of each WTG 100 progresses towards its power set point.

In some embodiments, adjusting power set points using the power ramping module 218 includes limiting the power production of one or more other WTGs 100 that are not currently undergoing a power ramping process, e.g., by derating one or more WTGs that are operating to produce a nominal power. As defined herein, "nominal" power production represents the amount of power that can be produced by a WTG with respect to the current operational conditions. The nominal power level of a WTG may vary over time, and is affected by several considerations, such as the available power in the wind, the rated power of the WTG, the current power reference provided by the WPP controller, and/or any current derating(s) of the WTG. Generally, the available power in the wind varies with wind speeds. The rated power of the WTG can be used to limit power production to less than the available power (e.g., during high wind speed conditions), the WPP controller reference may request less power than the available power, and in some cases the WTG may already operate with a derated power output based on high component temperatures or other conditions. Derating a WTG that operates to produce a nominal power thus comprises reducing the power output of the WTG from an initial power output value (which could represent the available power, the rated power, the requested power from the WPP controller, a derated power level, etc.) based on the current operational conditions.

If power ramping of a first WTG 100 at a particular power ramp rate would cause the WPP power output 245 to exceed the active power ramp rate limit 222, at least a second WTG 100 can be derated and its power ramped down at a corresponding rate to counter the excess caused by the first WTG 100. In some embodiments, limiting power production of the other WTGs 100 is performed temporarily, and the one or more other WTGs 100 are returned to nominal power production. Continuing the example, when the power ramping module 218 determines that the first WTG 100 has completed power ramping, or that the WPP power output 245 would no longer exceed the active power ramp rate limit 222, the power ramping module 218 can return the one or more other WTGs 100 to resume nominal power production.

Power ramping module 218 may include a timer module 224, including one or more timers used for coordinating operation of the WTGs 100. In some embodiments, timers are started when a WTG 100 communicates to the PPC 205 that the WTG 100 has reached a ready state to produce power (including a rotor speed at a nominal rotor speed value), or another operational mode or state. In order to comply with the active power ramp rate limit 222, the power ramping module 218 may deliberately maintain WTG 100 in the ready state, delaying the start of power production of the WTG 100. However, the WTG 100 may be unable to operate in the ready state indefinitely, as the operation may accelerate wear on the drivetrain or other components of the WTG. Thus, when WTG 100 indicates a ready state, the timer module 224 may begin a timer with a first predetermined interval. At any point during the first predetermined interval, the power ramping module 218 may instruct the WTG to begin power production based on one or more predetermined conditions, such as the WPP power output reaching a predetermined threshold value. If, after the first predetermined interval has elapsed, the power ramping module 218 has not yet caused the WTG to begin producing power (say the WPP power output 245 would still exceed the active power ramp rate limit 222), the timer module 224 may signal the WTG 100 to begin producing power in order to reduce the possibility of harm to the WTG components. Alternately, the expiration of the timer may indicate that the WTG will begin producing power, without requiring receipt of an additional instruction from the PPC 205. In either case, the expiration of the timer can also cause the power ramping module 218 to limit power production from one or more other WTGs to accommodate the power ramping of the WTG 100 within the active power ramp rate limit 222. In an alternate embodiment, the power ramping module 218 upon expiration of the timer may return the "ready" WTG 100 into one of the other operational modes to reduce the possibility of harm to the WTG components.

In some embodiments, the power ramping module 218 is configured to dynamically and selectively control power production according to one or more of (1) a first delay before instructing the first WTG controller to begin producing power, (2) a power ramp rate reference less than the default power ramp rate of the first WTG, and (3) a power reference less than a nominal power output of the first WTG. In other embodiments, the power ramping module 218 is configured to control power production by implementing one or more of (1)-(3), but is not configured to dynamically update which one(s) of (1)-(3) are implemented.

The memory 265 included in WTG controller 255 includes a timer module 290 generally including one or more timers used for coordinating operation of the WTG 100. In some embodiments, the timer module 290 can behave comparably to the timer module 224, e.g., starting a timer when the WTG 100 has reached a ready state to produce power or another operational mode or state. Memory 265 includes one or more operational modes 266 (or states) for the associated WTG 100. As shown, the operational modes 266 include a standstill mode 268 (also "standstill state"), a standby/free-wheeling mode 270 (also "standby state"), ready/nominal rotor speed mode 272 (also "ready state"), and a nominal power mode 274 (also "nominal state"). The depicted operational modes 266 shown are meant as non-limiting examples, as other modes and/or combinations of modes are possible.

Within standstill mode 268, the rotor speed of the WTG 100 is essentially zero, and the WTG 100 is not producing power. For example, a rotor brake may be engaged with the stopped rotor in the standstill mode. In some cases, the WTG controller 255 associated with the WTG 100 is instructed—while the WTG 100 is in standstill mode 268—to reach the ready state 272 for producing power. In response to the instruction, the WTG controller 255 begins one or more preparatory actions for the WTG 100 using preparatory actions module 276. The preparatory actions module 276 is configured to prepare the WTG 100 for nominal power mode 274, and may be further configured to prepare the WTG 100 for one or more other operational modes 266. The particular preparatory actions to be taken for the WTG 100 depends on the current operational mode 266 as well as the target operational mode 266. For example, transitioning the WTG 100 from a standstill state 268 to a standby state 270 generally requires less extensive preparatory actions than transitioning to nominal power production in the nominal state 274. Some examples of preparatory actions include releasing the rotor brake, increasing the rotor speed to the nominal rotor speed value, performing a function check of the pitch system of the WTG 100, heating oil for a drivetrain of the WTG 100 to a predetermined temperature value, and increasing oil pressure for the pitch system to a predetermined pressure value, though additional preparatory actions and/or combinations of preparatory actions are possible. In some cases, the preparatory actions module 276 requires all of the preparatory actions to be completed prior to transitioning the WTG 100 into the nominal state 274. For transitioning WTG 100 into other (intermediate) states, some or all of the preparatory actions may be in progress. For example, transitioning the WTG 100 to the standby state 270 requires increasing rotor speed to an intermediate value that is less than the nominal rotor speed, and as a result the WTG 100 is not yet ready to begin power production.

The operational modes 266 include two or more modes in which the rotor speed of the WTG 100 is a non-zero value, but no power production is occurring. In the ready/nominal rotor speed mode 272, the rotor speed of the WTG 100 follows a "nominal" rotor speed value representing the rotor speed corresponding to nominal power production. As discussed above, nominal power production may vary based on the current operational conditions of the WTG; the nominal rotor speed value may similarly vary. For example, the nominal rotor speed value may be based on the current wind speeds, the rated speed of the WTG, and/or the selected power production level.

Because the WTG 100 is not producing power (i.e., no torque) while operating at the nominal rotor speed value in the ready/nominal rotor speed mode 272, there can be an increased risk of harm to drivetrain components. For example, in the ready/nominal rotor speed mode 272, the drivetrain can exhibit gear torque reversals, smearing or other damage to bearings, etc. As a result, the WTG 100 may be held in the ready state 272 for at most a relatively short time period—e.g., using timer module 224 and/or timer module 290—before transitioning to a nominal state 274. Alternatively, the WTG 100 may be transitioned into another operational mode 266 upon elapse of the prescribed interval, such as standstill mode 268 or standby mode 270. In some embodiments, a first predetermined interval for the timer module 224/290 is determined based on a power ramping time of WTGs 100 to a predetermined power level. In some embodiments, the first predetermined interval is on the order of one minute or less. For example, if a first WTG 100 requires at most about 15 seconds to ramp power from zero to a predetermined power level—such as a technical minimum power level (which can correspond to a percentage of the nominal power of the first WTG 100)—the first predetermined interval for the timer module 224/290 relating to ramping power for a second WTG 100 can be set to be greater than this amount, leaving one or more margins for optimization. For example, the first predetermined interval could be set to about 30 seconds corresponding to the 15-second ramp time for the first WTG 100.

In the standby/free-wheeling mode 270, the rotor speed has been increased from near zero to a value that is significantly less than the nominal rotor speed of the WTG (as used in ready state 272 and nominal state 274), such that the loads on the drivetrain are reduced and concerns of accelerated wear are also reduced. For example, depending on the desired generator rotational speed and the gear ratios of the drivetrain, a nominal rotor speed may be on the order of 10 rotations per minute (rpm) or greater (e.g., 12 rpm, 16 rpm), while a rotor speed within the standby state 270 may be on the order of a few rpm (such as 4 rpm, 5 rpm). Accordingly, the WTG 100 may maintain the standby state 270 for a significantly longer time than the ready state 272. The timer module 224 and/or timer module 290 are used to transition the WTG 100 out of the standby state 270 after a second predetermined interval. In some embodiments, the second predetermined interval is on the order of one hour or less, such as about 30 minutes. After elapse of the second predetermined interval, the WTG controller 255 may continue to progress the WTG 100 toward power production, transitioning the WTG 100 to the ready state 272 or nominal state 274.

The nominal power mode 274 corresponds to a nominal power production of the WTG 100, which also corresponds to a nominal rotor speed of the WTG 100. In some embodiments, the power ramping module 218 of the PPC 205 is configured to temporarily derate power production of one or more WTGs 100 from their nominal power production in order to meet an active power ramp rate limit 222.

The memory 265 also maintains one or more parameters 278 related to operation of the WTG 100, which may be communicated between WTG controllers 255 and the PPC 205. Additionally or alternatively, some or all of the parameters 278 are stored in the memory 215 of the PPC 205. Parameters 278 include rotor speed 280 of the WTG 100, which may be measured by one or more sensors. Parameters 278 also include a power set point 282 for the WTG 100, which in some cases is specified by the PPC 205 and can be influenced by power ramping module 218. In some cases, the WTG controller 255 receives a power ramp rate reference 228 and a power set point reference 230 from the PPC 205, and the WTG controller produces the power set point 282 based on these two references. Parameters 278 also include a nominal power value 284 and a nominal rotor speed value 286 of the WTG 100. Parameters 278 also include a default power ramp rate 288, at which the WTG 100 is configured to ramp up power in the absence of another ramp rate specified by the PPC 205 or otherwise calculated by the WTG controller 255. In some embodiments, the power ramp rate reference 228 delivered to the WTG 100 is calculated by the PPC 205 to be less than the default power ramp rate 288 of the WTG 100.

Figure 3:
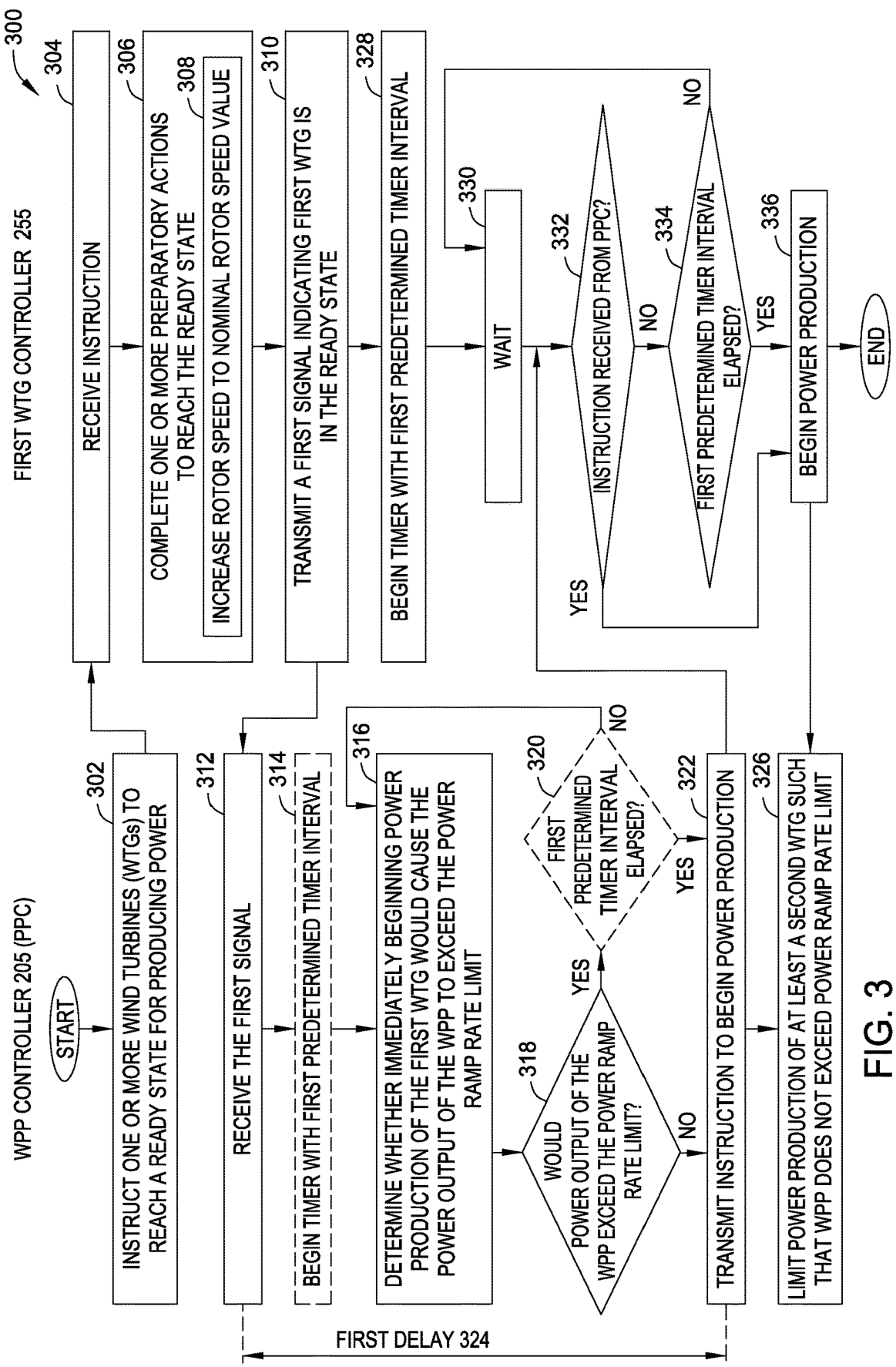
FIG. 3 illustrates a method of controlling a power output of a wind power plant (WPP) according to a predetermined power ramp rate limit, according to one embodiment.

FIG. 3 illustrates a method of controlling a power output of a wind power plant (WPP) according to a predetermined power ramp rate limit, according to one embodiment. Method 300 generally corresponds to the operation of wind power plant 200 (and its control arrangement 202) discussed above. The functional blocks included in the left column can be performed by WPP controller 205, and functional blocks included in the right column can be performed by a WTG controller 255 corresponding to a particular WTG. However, the person of ordinary skill will understand that certain functions are capable of being performed by either WPP controller 205 or WTG controller 255, or by other elements entirely.

Method 300 begins at block 302, where the WPP controller 205 instructs one or more WTGs of the WPP to reach a ready state for producing power. The one or more WTGs may be in a standstill state or in other non-power producing state, such as a free-wheeling state or other standby states. Upon receiving the instruction at block 304, a first WTG controller corresponding to a first WTG proceeds to complete one or more preparatory actions for the first WTG to reach the ready state at block 306. One preparatory action includes increasing the rotor speed of the first WTG to a nominal rotor speed value at block 308. One or more other preparatory actions may be performed and/or completed at block 306, such as performing a function check of the pitch system of the first WTG, heating the oil for a drivetrain of the first WTG to a predetermined temperature value, and increasing the oil pressure for the pitch system to a predetermined pressure value.

Upon completing the preparatory actions and reaching the ready state, at block 310 the first WTG controller 255 transmits a first signal to the WPP controller 205 indicating that the first WTG is in the ready state. The initial instruction at block 302 and the first signal can be viewed a first "handshake" communication used to coordinate the actions of the WPP controller 205 and WTG controller 255. Upon receiving the first signal at block 312, at block 314 the WPP controller may optionally begin a timer with a first predetermined timer interval corresponding to a maximum amount of time that the first WTG is permitted to remain in the ready state before transitioning to another state. In some embodiments, the first predetermined timer interval is on the order of one minute or less. At block 316, the WPP controller 205 determines whether immediately beginning power production by the first WTG would cause the power output of the WPP to exceed the power ramp rate limit. If the power output would exceed the limit (block 318; YES), the WPP controller 205 optionally determines whether the first predetermined timer interval has elapsed at block 320, indicating that the first WTG is going to (or should be instructed to) begin power production. If the first predetermined timer interval has not elapsed (block 320; NO), the method returns to block 316.

If the first predetermined timer interval has elapsed (block 320; YES) or the power output of the WPP would not exceed the power ramp rate limit (block 318; NO), the WPP controller 205 transmits an instruction to a first WTG controller 255 to begin power production at block 322. Additionally, the WPP controller 205 may provide a power set point reference and/or a power ramp rate reference to the first WTG controller 255 to ensure power production by the first WTG does not cause the WPP power output to exceed the power ramp rate limit. Furthermore, and based on the determination of block 316, the WPP controller 205 at block 326 may temporarily limit the power production of at least a second WTG such that the WPP does not exceed the power ramp rate limit, such as by derating the second WTG. The time difference between blocks 312 and 322 represents a first delay imposed by the WPP controller 205 after the first WTG indicates that it is in a ready state for producing power.

Returning to block 310, after transmitting the first signal indicating that the first WTG is in the ready state, the first WTG controller 255 begins a timer with the first predetermined timer interval at block 328. In this way, the time that the first WTG is in the ready state can be closely monitored and controlled by the first WTG controller 255 and/or the WPP controller 205. At block 330, the first WTG controller 255 awaits the first of (1) receiving an instruction from the WPP controller 205, (2) elapse of the first predetermined timer interval, and (3) meeting one or more predetermined conditions to begin power production. Of course, the first WTG controller 255 may perform other tasks during this waiting period. If no instruction is received from the WPP controller 205 and the predetermined conditions are not met (block 332; NO) and the first predetermined interval has not elapsed (block 334; NO), the first WTG controller 255 continues waiting at block 330. However, if an instruction is received from the WPP controller or the predetermined conditions are met (block 332; YES), or the first predetermined timer interval has elapsed (block 334; YES), the first WTG controller 255 begins power production at block 336. In response to determining that the first WTG is beginning power production, in one embodiment the method proceeds to block 326, where the WPP controller 205 temporarily limits the power production of at least a second WTG such that the WPP does not exceed the power ramp rate limit. Generally, method 300 ends after completing block 336.

Figure 4:
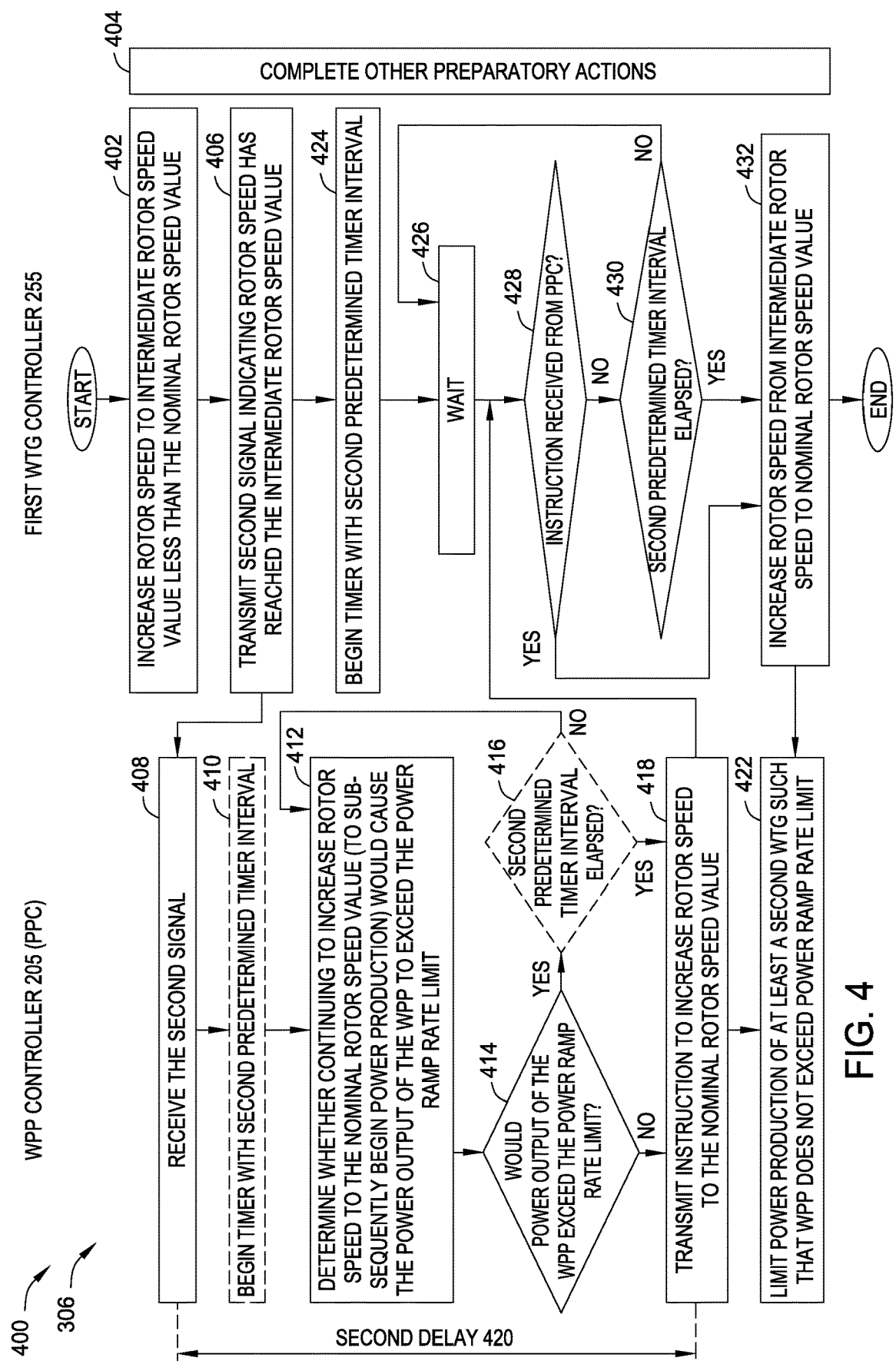
FIG. 4 illustrates a method of completing one or more preparatory actions for a wind turbine generator (WTG) to reach a ready state to begin producing power, according to one embodiment.

FIG. 4 illustrates a method of completing one or more preparatory actions for a wind turbine generator (WTG) to reach a ready state to begin producing power, according to one embodiment. Method 400 generally corresponds to the operation of wind power plant 200 (and its control arrangement 202) discussed above. The functional blocks may be performed at part of block 306 of method 300, discussed above.

Method 400 begins at block 402, where the first WTG controller 255 increases a rotor speed of the first WTG to an intermediate rotor speed value that is less than the nominal rotor speed value. In some embodiments, this intermediate rotor speed value corresponds to a standby state or a free-wheeling state for the first WTG. In some embodiments, the intermediate rotor speed value is significantly less than the nominal rotor speed value, such that the loads on the drivetrain are reduced and concerns of accelerated wear are also reduced.

At block 404, which may occur contemporaneously with block 402 and/or any other function blocks in method 400, the first WTG controller 255 completes one or more other preparatory actions (i.e., in addition to increasing the rotor speed of the first WTG), such as performing a function check of the pitch system of the first WTG, heating the oil for a drivetrain of the first WTG to a predetermined temperature value, and increasing the oil pressure for the pitch system to a predetermined pressure value.

At block 406, the first WTG controller transmits a second signal to the WPP controller 205 indicating that the rotor speed has reached the intermediate rotor speed value. The initial instruction from WPP controller 205 (at block 302 of FIG. 3) and the second signal can be viewed a first "handshake" communication used to coordinate the actions of the WPP controller 205 and WTG controller 255. Upon receiving the second signal at block 408, the WPP controller 205 optionally begins a timer with a second predetermined timer interval corresponding to a maximum amount of time that the first WTG is permitted to remain in the standby state before transitioning to another state. In some embodiments, the second predetermined timer interval is on the order of one hour or less.

At block 412, the WPP controller 205 determines whether continuing to increase the rotor speed to the nominal rotor speed value to subsequently begin power production by the first WTG would cause the power output of the WPP to exceed the power ramp rate limit. As part of the determination, the WPP controller 205 may estimate a length of time required for the first WTG to reach the ready state, and determine whether the power ramp rate limit would be exceeded based on beginning power output from the first WTG after the estimated length of time. If the power output would exceed the limit (block 414; YES), the WPP controller 205 optionally determines whether the second predetermined timer interval has elapsed at block 416, indicating that the first WTG is going to (or should be instructed to) proceed to the ready state to begin power production. If the second predetermined timer interval has not elapsed (block 416; NO), the method returns to block 412.

If the second predetermined timer interval has elapsed (block 416; YES) or the power output of the WPP would not exceed the power ramp rate limit (block 414; NO), the WPP controller 205 transmits an instruction to first WTG controller 255 to increase the rotor speed of the first WTG to the nominal rotor speed value at block 418. Furthermore, and based on the determination of block 412, the WPP controller 205 at block 422 may temporarily limit (or schedule a temporary limiting of) the power production of at least a second WTG such that the WPP does not exceed the power ramp rate limit, such as by derating the second WTG. Limiting power production of the second WTG may be performed based on the estimated length of time for the first WTG to reach the ready state, in order to maximize power production of the WPP. The time difference between blocks 408 and 420 represents a second delay imposed by the WPP controller 205 after the first WTG indicates that it is in an intermediate, free-wheeling state or other standby state with a predetermined, non-zero rotor speed.

Returning to block 406, after transmitting the second signal indicating that the rotor speed of the first WTG has reached the intermediate rotor speed value, the first WTG controller 255 begins a timer with the second predetermined timer interval at block 424. In this way, the time that the first WTG is in the standby state can be closely monitored and controlled by the first WTG controller 255 and/or the WPP controller 205. At block 426, the first WTG controller 255 awaits the first of (1) receiving an instruction from the WPP controller 205, (2) elapse of the second predetermined timer interval, and (3) meeting one or more predetermined conditions to begin power production. Of course, the first WTG controller 255 may perform other tasks during this waiting period. If no instruction is received from the WPP controller 205 and the predetermined conditions are not met (block 428; NO) and the second predetermined interval has not elapsed (block 430; NO), the first WTG controller 255 continues waiting at block 426. However, if an instruction is received from the WPP controller or the predetermined conditions are met (block 428; YES), or the first predetermined timer interval has elapsed (block 430; YES), the first WTG controller 255 increases rotor speed to the nominal rotor speed value at block 432. In response to determining that the first WTG is proceeding to increase rotor speed to subsequently produce power, in one embodiment the method proceeds to block 422, where the WPP controller 205 temporarily limits (or schedules the temporary limiting of) the power production of at least a second WTG such that the WPP does not exceed the power ramp rate limit. Generally, method 400 ends after completing block 432. The instruction from WPP controller 205 at block 428 and the first signal indicating the first WTG has reached a ready state (block 310 of FIG. 3) can be viewed a second "handshake" communication used to coordinate the actions of the WPP controller 205 and WTG controller 255.

Figure 5:
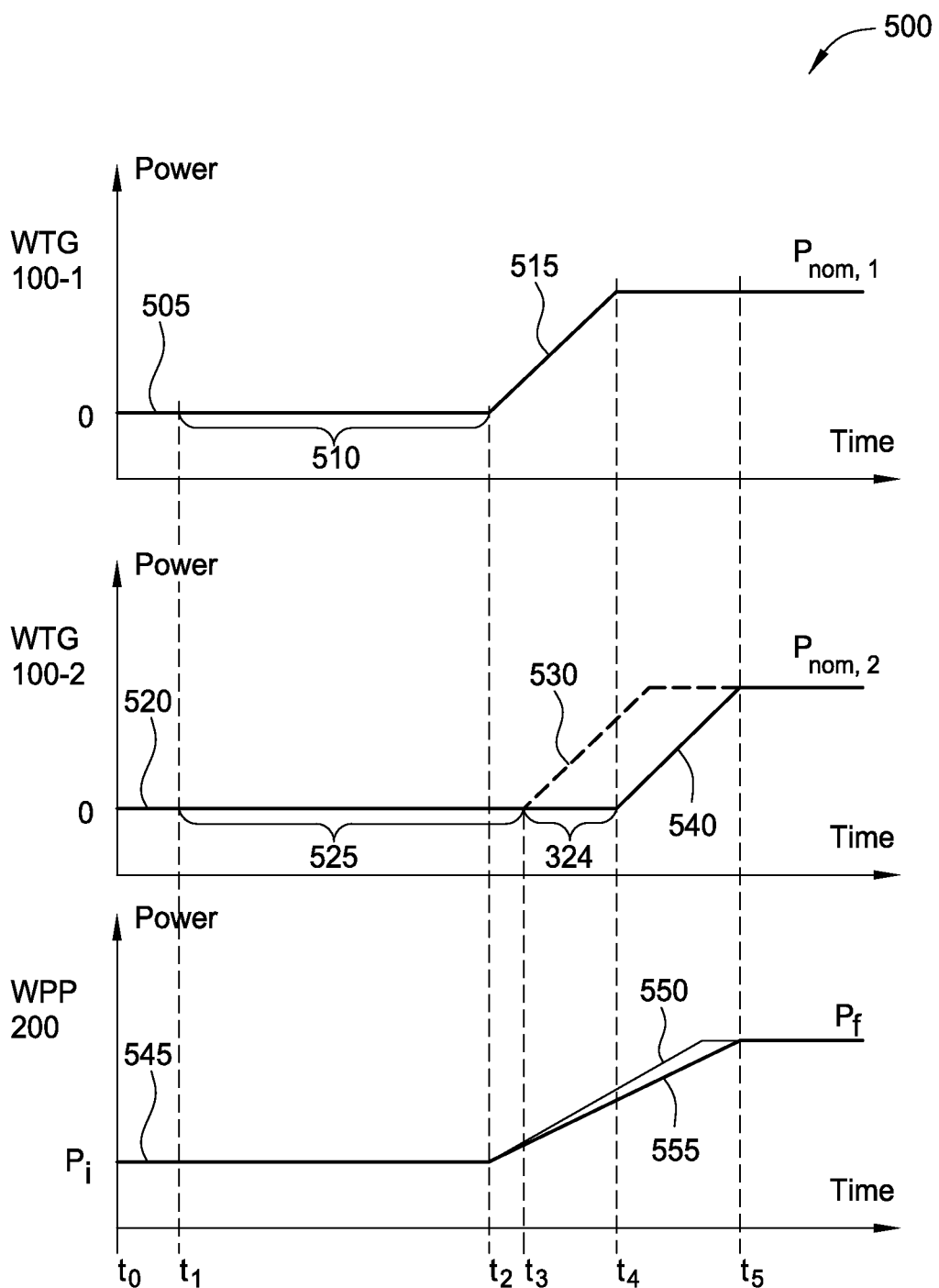
FIG. 5 includes power output plots for two wind turbine generators (WTGs) and an associated wind power plant (WPP) illustrating a first delay for WTG power production, according to one embodiment.

FIG. 5 includes power output plots for two wind turbine generators (WTGs) and an associated wind power plant (WPP) illustrating a first delay for WTG power production, according to one embodiment. Graph 500 includes plot 505 representing a power output of a first WTG 100-1, plot 520 representing a power output from a second WTG 100-2, and plot 545 representing a power output from a WPP 200 that includes the first WTG 100-1 and second WTG 100-2. At time $t_0$, first WTG 100-1 and second WTG 100-2 may be in any non-power producing state, such as a standstill state or any standby states. While plots 505, 520 each have a zero power value at time $t_0$, the plot 545 for WPP 200 is at an initial power value $P_i$, which may be zero or may be a positive power value. For example, one or more other WTGs 100 (not shown) may be producing nominal power levels that are reflected in the initial power value $P_i$.

At time $t_1$, the WPP controller instructs first WTG 100-1 and second WTG 100-2 to reach a ready state for producing power. In response, first WTG 100-1 and second WTG 100-2 each complete one or more preparatory actions during intervals 510, 525 in order to reach the ready state, which includes increasing rotor speed to a nominal rotor speed value. Based on the operational status of each WTG 100-1, 100-2, the time required to complete the preparatory actions may differ—interval 510 is shorter than 525. At time $t_2$, the first WTG 100-1 transmits a signal to the WPP controller indicating that the first WTG 100-1 has reached the ready state. The WPP controller then determines whether immediately beginning power production by first WTG 100-1 would cause the WPP power output to exceed the power ramp rate limit 550. The WPP power ramp rate between times $t_0$ and $t_2$ is zero, as plot 545 remains at $P_i$, value, and assuming for purposes of this example that no other WTGs of the WPP are ramping power at time $t_2$, the WPP controller determines that immediately beginning power production with first WTG 100-1 will not cause the WPP power output to exceed the power ramp rate limit 550. WPP controller instructs first WTG 100-1 to begin power production at time $t_2$, and between times $t_2$ and $t_4$ (plot segment 515), first WTG 100-1 ramps power from zero to a corresponding nominal power $P_{nom,1}$.

At time $t_3$, while the first WTG 100-1 is ramping power output, the second WTG 100-2 transmits a signal to the WPP controller indicating that the second WTG 100-2 has reached the ready state. The second WTG 100-2, if permitted or instructed to begin producing power immediately at time $t_3$, could ramp up power as shown in segment 530 (shown in phantom). However, the WPP controller determines that immediately ramping power from the second WTG 100-2 would cause the WPP power output ramp rate (segment 555) to exceed the power ramp rate limit 550, and provides a first delay 324 before instructing the second WTG 100-2 to begin ramping at time $t_4$. The second WTG 100-2 begins power production at time $t_4$, and between times $t_4$ and $t_5$ (plot segment 540), the second WTG 100-2 ramps power from zero to a corresponding nominal power $P\ P_{nom,2}$.

In some embodiments, the instruction to second WTG 100-2 may be responsive to the WPP controller determining that first WTG 100-1 has completed its power ramping (e.g., determining that the power set point for first WTG 100-1 was reached). Additionally or alternatively to the first delay for second WTG 100-2, the WPP controller may control the combined power output of first WTG 100-1 and/or second WTG 100-2 to prevent exceeding the power ramp rate limit 550 using power ramp rate references, power set point references, temporarily derating another WTG of the WPP 200, and so forth.

Figure 6:
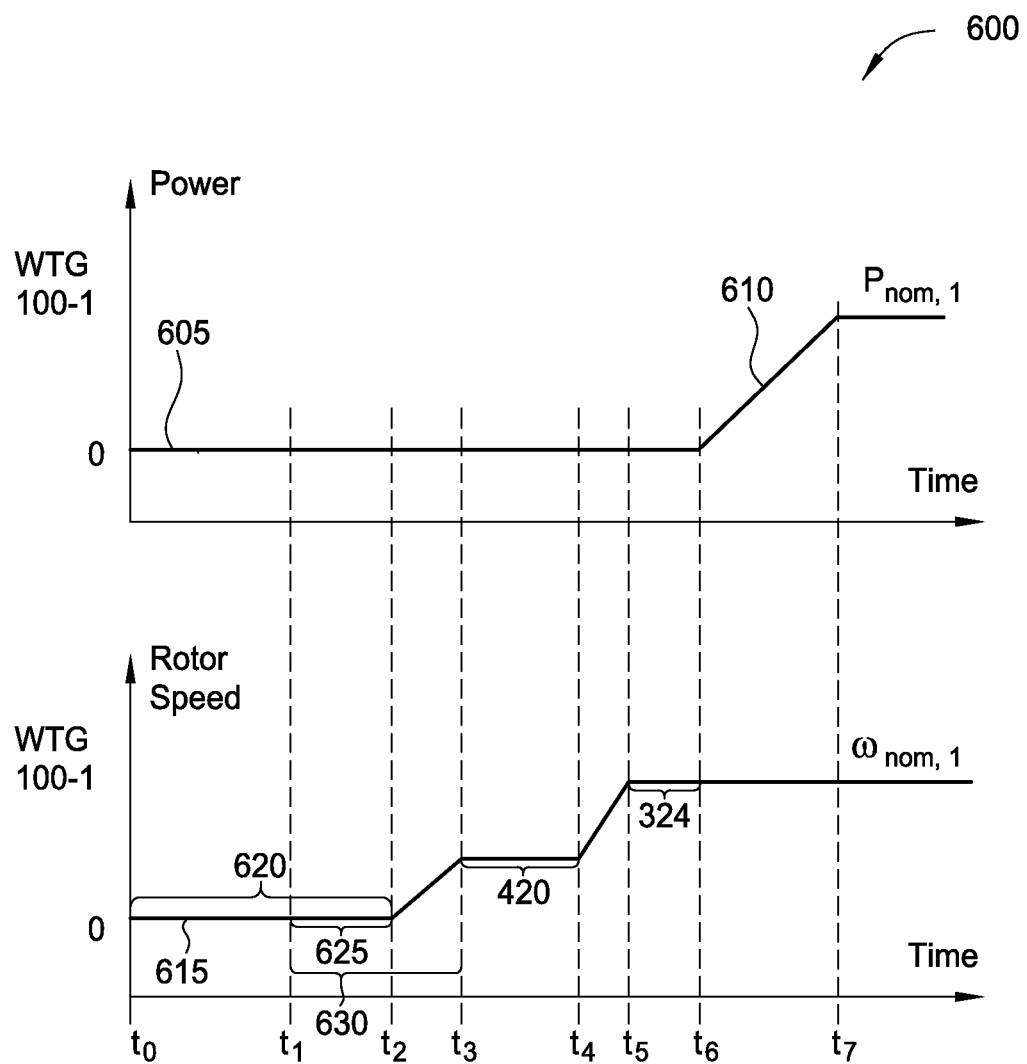
FIG. 6 includes power output and rotor speed plots for a wind turbine generator (WTG) illustrating first and second delays for WTG power production, according to one embodiment.

FIG. 6 includes power output and rotor speed plots for a wind turbine generator (WTG) illustrating first and second delays for WTG power production, according to one embodiment. Graph 600 includes plot 605 representing power output from a WTG 100-1 of a WPP, and plot 615 representing a rotor speed of the WTG 100-1.

At time $t_0$, the WTG 100-1 has zero power output and zero rotor speed, which may correspond to a standstill state for the WTG 100-1. Alternatively, WTG 100-1 may have a non-zero rotor speed at time $t_0$. At time $t_1$, the WPP controller instructs the WTG 100-1 to reach a ready state for producing power. The WTG 100-1 begins one or more preparatory actions between times $t_1$ and $t_3$ (corresponding to interval 630), which includes increasing rotor speed to an intermediate rotor speed value. The interval 630 for the preparatory actions may include an interval 625, in which the rotor speed is not increased, prior to increasing the rotor speed beginning at time $t_2$. At time $t_3$, the WTG 100-1 transmits a signal to the WPP controller indicating that the WTG 100-1 has reached the intermediate rotor speed value (or standby state, free-wheeling state, etc.). The WPP controller then determines whether continuing to increase rotor speed to subsequently begin power production by WTG 100-1 would cause the WPP power output to exceed the power ramp rate limit (not shown). Determining that proceeding to begin power production from the WTG 100-1 would cause the WPP power output to exceed the power ramp rate limit, the WPP controller provides a second delay 420 before instructing the WTG 100-1 to continue increasing rotor speed at time $t_4$. The WTG 100-1 increases rotor speed to the nominal rotor speed value $\omega_{nom,1}$ at time $t_5$, and transmits a signal to the WPP controller indicating that the WTG 100-1 has reached the ready state. The WPP controller determines that immediately ramping power from the WTG 100-1 would cause the WPP power output to exceed the power ramp rate limit, and provides the first delay 324 before instructing the WTG 100-1 to begin ramping at time $t_6$. Power production from WTG 100-1 is ramped between times $t_6$ and $t_7$, when the power output of WTG 100-1 reaches a nominal power output $P_{nom,1}$.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method of controlling a plant power output of a wind power plant (WPP) according to a predetermined power ramp rate limit, the WPP comprising a plurality of wind turbine generators (WTGs), the method comprising:
receiving, from a first WTG of the plurality of WTGs, a first signal indicating that a rotor speed of the first WTG has reached a predetermined intermediate rotor speed value less than a nominal rotor speed value corresponding to nominal power production of the first WTG;
determining, responsive to the first signal, whether continuing to increase the rotor speed from the intermediate rotor speed value to the nominal rotor speed value to subsequently begin power production of the first WTG at a predetermined default power ramp rate would cause the plant power output to exceed the power ramp rate limit;
transmitting, after a first delay, an instruction to the first WTG to increase the rotor speed from the intermediate rotor speed value to the nominal rotor speed value;
receiving, from the first WTG, a second signal indicating that the first WTG is in a ready state to begin producing power; and
upon determining that, responsive to the second signal, beginning the power production of the first WTG at the predetermined default power ramp rate would cause the plant power output to exceed the power ramp rate limit:
controlling the power production of the first WTG using at least one of: (1) a second delay before instructing the first WTG to begin producing power, (2) a power ramp rate reference less than the default power ramp rate of the first WTG, and (3) a power reference less than a nominal power output of the first WTG.

2. The method of claim 1, wherein the ready state corresponds to one or more completed preparatory actions for the first WTG to begin producing power, the one or more completed preparatory actions comprising increasing the rotor speed of the first WTG to the nominal rotor speed value.

3. The method of claim 1, further comprising:
determining that the first WTG has begun power production following expiration of one of: a first predetermined interval after receiving the first signal, and a second predetermined interval after receiving the second signal; and
limiting power production of at least a second WTG of the plurality of WTGs such that the power production of the first WTG does not cause the plant power output to exceed the power ramp rate limit.

4. The method of claim 3, wherein limiting power production of at least a second WTG comprises derating the power production of the second WTG.

5. The method of claim 3, wherein the second predetermined interval is selected to limit effects on a drivetrain of the first WTG of operating at the nominal rotor speed value without producing power.

6. The method of claim 1, wherein the second delay corresponds to power production of a third WTG of the plurality of WTGs, wherein instructing the first WTG to begin producing power occurs upon determining that the third WTG has completed power ramping.

7. The method of claim 1, wherein the first delay is relative to receipt of the first signal.

8. The method of claim 1, wherein the second delay is relative to receipt of the second signal.

9. A control arrangement for operating a wind power plant (WPP) according to a predetermined power ramp rate limit, the WPP comprising a plurality of wind turbine generators (WTGs), the control arrangement comprising:
a plurality of WTG controllers corresponding to the plurality of WTGs;
a power plant controller (PPC) communicatively coupled with the plurality of WTG controllers, wherein the PPC is configured to:
receive, from a first WTG controller of the plurality of WTG controllers corresponding to a first WTG of the plurality of WTGs, a first signal indicating that a rotor speed of the first WTG has reached a predetermined intermediate rotor speed value less than a nominal rotor speed value corresponding to nominal power production of the first WTG;
determine, responsive to the first signal, whether continuing to increase the rotor speed from the intermediate rotor speed value to the nominal rotor speed value to subsequently begin power production by the first WTG at a predetermined default power ramp rate would cause a plant power output of the WPP to exceed the power ramp rate limit;
transmit, after a first delay, an instruction to the first WTG controller to increase the rotor speed from the intermediate rotor speed value to the nominal rotor speed value;
receive, from the first WTG controller, a second signal indicating that the first WTG is in a ready state to begin producing power; and
upon determining that, responsive to the second signal, beginning the power production of the first WTG at the predetermined default power ramp rate would cause the plant power output to exceed the power ramp rate limit:
control the power production of the first WTG using at least one of: (1) a second delay before instructing the first WTG controller to begin producing power, (2) transmitting a power ramp rate reference less than the default power ramp rate of the first WTG, and (3) transmitting a power reference less than a nominal power output of the first WTG.

10. The control arrangement of claim 9, wherein the ready state corresponds to one or more completed preparatory actions for the first WTG to begin producing power, the one or more completed preparatory actions comprising increasing the rotor speed of the first WTG to the predetermined nominal rotor speed value.

11. The control arrangement of claim 10, wherein the one or more completed preparatory actions further comprises at least one of a function check of a pitch system of the first WTG, heating oil for a drivetrain of the first WTG to a predetermined temperature value, and increasing pressure of oil for the pitch system to a predetermined pressure value.

12. The control arrangement of claim 9, wherein the first WTG controller comprises one or more timers and is configured to transmit a third signal to the PPC upon the expiration of one of: a first predetermined timer interval after transmitting the first signal to the PPC, and a second predetermined timer interval after transmitting the second signal to the PPC, the third signal indicating that the first WTG is beginning power production, and wherein the power plant controller is further configured to limit power production of at least a second WTG of the plurality of WTGs such that the power production of the first WTG does not cause the plant power output to exceed the power ramp rate limit.

13. The control arrangement of claim 12, wherein limiting power production of at least a second WTG comprises derating the power production of the second WTG.

14. The control arrangement of claim 12, wherein the second predetermined timer interval is selected to limit effects on a drivetrain of the first WTG of operating at the nominal rotor speed value without producing power.

15. The control arrangement of claim 9, wherein the second delay corresponds to power production of a third WTG of the plurality of WTGs, wherein the PPC is further configured to instruct the first WTG to begin producing power upon determining that the third WTG has completed power ramping.

* * * * *